United States Patent [19]

Panetti

[11] Patent Number: 4,531,837
[45] Date of Patent: Jul. 30, 1985

[54] METHOD FOR MEASURING THE TRANSVERSE PROFILE OF THE HEAD OF A RAIL OF A RAILROAD TRACK

[75] Inventor: Romolo Panetti, Geneva, Switzerland

[73] Assignee: Speno International S.A., Geneva, Switzerland

[21] Appl. No.: 463,051

[22] Filed: Feb. 1, 1983

[30] Foreign Application Priority Data

Feb. 25, 1982 [CH] Switzerland .......................... 1149/82

[51] Int. Cl.³ ............................................. G01B 11/24
[52] U.S. Cl. .................................... 356/376; 356/394; 356/398
[58] Field of Search ............... 356/375, 376, 394, 398, 356/4, 1

[56] References Cited

U.S. PATENT DOCUMENTS 3,619,065  11/1971  Agnew .................................. 356/394

Primary Examiner—R. A. Rosenberger
Assistant Examiner—Michael F. Vollero

[57] ABSTRACT

A method for measuring the transverse profile of the head of a rail of a railroad track according to which a luminous trace (1) is projected onto the surface of the head of a rail, in a direction perpendicular to the longitudinal axis of said rail, this trace (1) having a particular point (3). The trace obtained is observed from two directions forming an angle ($\alpha$) between them, located on either side of a longitudinal plane of the rail (2) and forming an angle with the plan of projection of the trace. This observation creates two partial reproductions (1'; 1'') of this trace (1). Finally the two partial representations (1', 1'') are angularly displaced by an angle corresponding to the angles from which the trace is observed and the images (3', 3'') of the particular point (3) of the trace (1) are superimposed to obtain the representation of the transverse profile of the rail in its totality.

17 Claims, 9 Drawing Figures

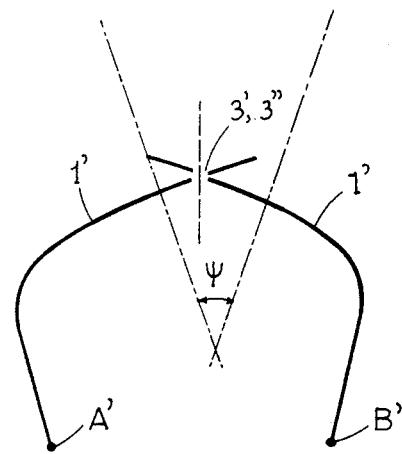
FIG. 4
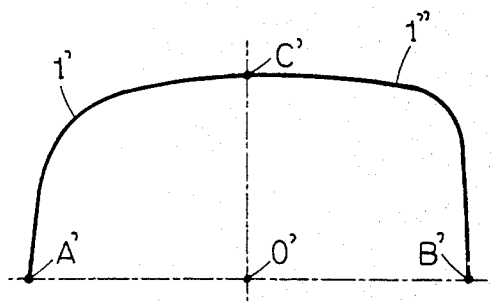
FIG. 5
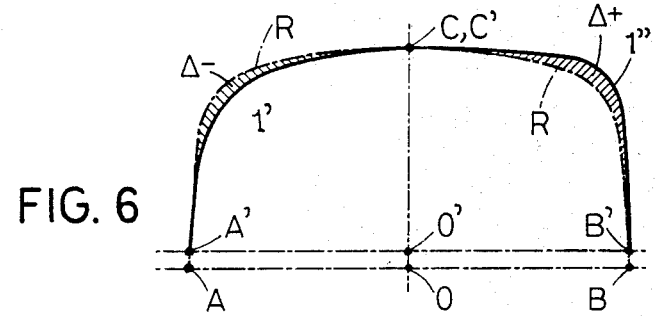
FIG. 6
FIG. 7
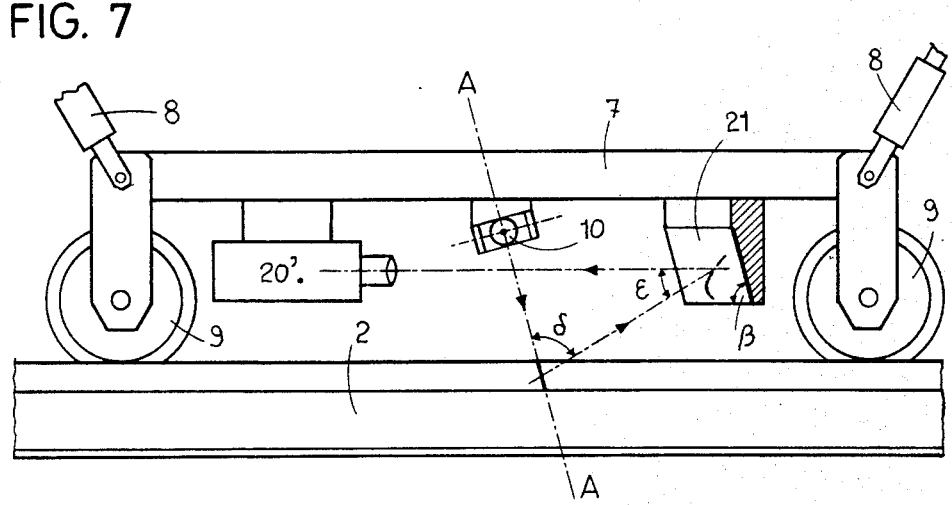

1

METHOD FOR MEASURING THE TRANSVERSE PROFILE OF THE HEAD OF A RAIL OF A RAILROAD TRACK

The present invention relates to a method and apparatus for measuring the transverse profile of the head of a rail of a railroad track. More precisely this method and this measuring apparatus are of the optical type, without direct contact with the rail.

Measuring methods of the transverse profile of the rolling surface of a rail or of other curved surfaces are known according to which a luminous line is projected on the surface to be measured in order to create a transverse luminous trace on said surface. This trace is then observed under an angle different from the one used for its projection. The image of the trace observed in this way can be reproduced on a screen or electronically handled to enable its comparison with a reference profile in order to obtain the deviation of the actual profile with respect to this reference profile.

These methods, as those described for example in the patent application DE-OS No. 2,356,491 and DE-OS No. 1,423,606 can be used to measure a curved surface as long as that surface has no portions extending parallely or tangentially to the direction of observation of the luminous trace, but they cannot be used to measure satisfactorily the profile of the edges and of the sides of the head of a rail.

To remedy this drawback it is true that there has been proposed (c.f. German patent application OS No. 2,855,877) to multiply the observation posts of the luminous trace but we then obtain several fragmental data which are very difficult to combine and interpret.

The present invention aims to remedy the drawbacks of these known measuring methods and apparatuses while maintaining the advantages of an optical measurement of the transverse profile of the rails of a railroad track. It permits obtaining with a precision of a hundredth of a millimeter the whole profile and the measurement of the head of the rail on its whole periphery, (rolling surface, edges, and sides of the head of the rail).

The method according to the present invention consists in projecting by means of radiations a trace on the periphery of the head of a rail of a railroad track, in a plane forming an angle with the longitudinal axis of the rail and to observe this trace from several directions located outside of the plane of projection of said trace.

This method is characterized in that one point of the trace is made a particular one to constitute a floating origin, by the fact that said trace is observed from at least two directions forming an angle to obtain partial reproductions of it containing each the floating origin, and by the fact that the images of the floating origin of the partial reproductions of the trace are superimposed and that said partial reproductions of the trace are angularly displaced around the said floating origin of an angle depending on the angles under which the trace is observed.

One obtains in this way a complete and extact reproduction of the transverse profile of the head of the rail. It is then possible to compare the profile of this head with a reference profile by superimposing the images of the observed profile and of the reference profile. The comparison of these two images permits measuring, for as many side lines as wanted, the deviations of the head of the rail observed with respect to said reference profile.

The attached drawings show schematically the method according to the invention and by way of example one embodiment of the apparatus.

FIGS. 4 and 5 show the reconstruction of the total profile of the head of the rail.

FIG. 6 shows the comparison of the actual profile of the head of the rail with a reference profile.

FIG. 7 shows a device according to the invention mounted on a carriage pulled by a railway vehicle.

FIG. 1 shows schematically the projection of a luminous trace 1 on the periphery of the head of a rail 2. This luminous trace is contained in a plane forming an angle with the longitudinal axis of the rail, but preferably in a plane transverse to the rail, perpendicular or not to the longitudinal axis of said rail.

This luminous trace can be replaced by any trace obtained by rays or radiations. One can use to this effect infra-red rays, ultra-violet rays, ultrasonic waves and so on.

In a variant, the trace 1 can be contained in two planes or half planes forming an angle between them as well as with the longitudinal axis of the rail. The luminous trace 1 comprises on the rolling surface of the head of the rail a particular point 3. This particualar point 3 can be a point having a different luminous intensity than the rest of the trace obtained by a local obliteration of the light rays projecting the trace, by a superimposition of another luminous source or a portion of the trace or by the intersection of two portions of the trace when said trace is contained in two half-planes.

The observation of the trace is made either with only one camera 4 and two mirrors 5 located on either side of the axis of the rail and making an angle $\alpha$ between them, or by means of two cameras, which enables a double partial observation of the luminous trace at an angle of $180° - \alpha = \gamma$. The shape of these partial observations of the trace 1 and their relative position depends further on all the angles at which the trace is observed, the angle $\beta$ between the mirrors and the longitudinal axis of the rail, and of the angles $\delta$ and $\epsilon$ which the optical axis of the camera 4 forms with respect to the longitudinal axis of the rail. Each of these partial observations reproduces the particular point 3 of the trace 1.

Figure 1:
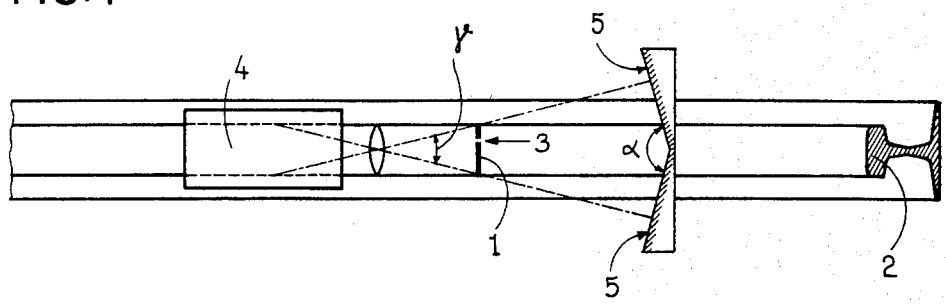
FIGS. 1 and 2 show schematically from above and from the side the luminous trace projected on the rail and the observation devices of said trace.
Figure 2:
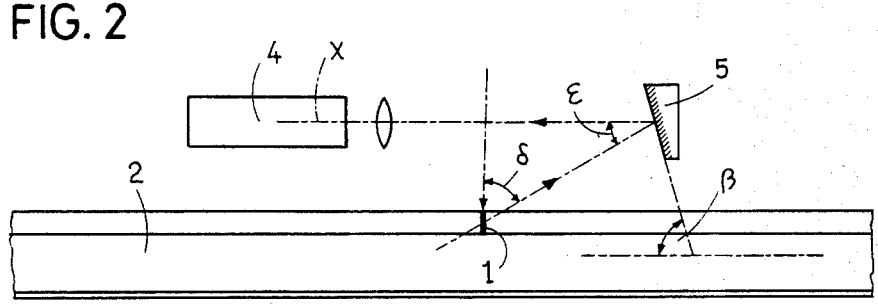
Figure 3:
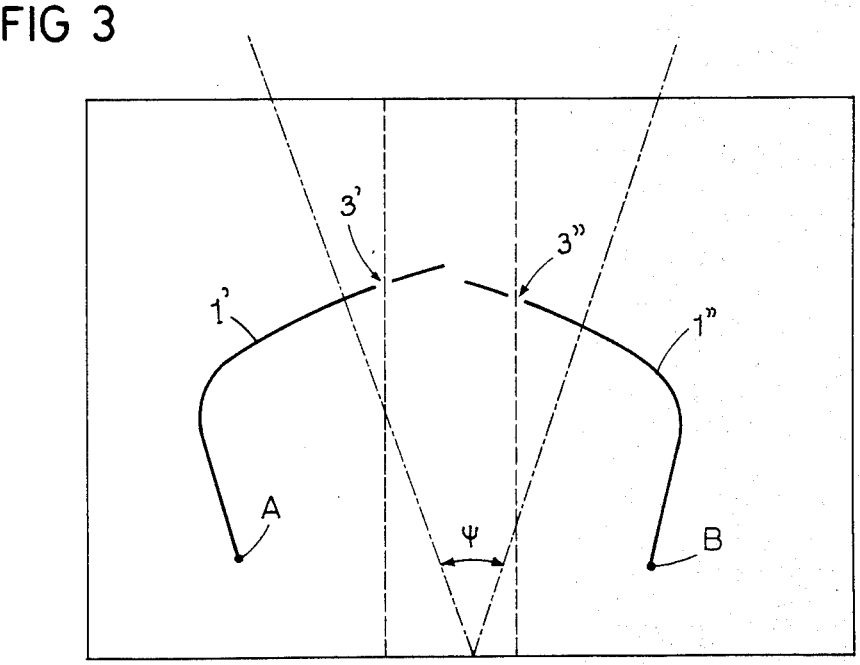
FIG. 3 shows the partial representations of the luminous trace as they are observed.

FIG. 3 shows the two partial reproductions 1', 1" obtained by this method comprising each the image 3', 3" of the particular point, or floating origin 3 of the trace 1.

Through a translation, the two partial images 1' and 1" of the trace 1 are displaced towards one another to have the two images 3', 3" of the particular point 3 of the trace coincide. The image obtained after translation is shown in FIG. 4. To obtain a correct representation of the trace 1, the two partial representations 1', 1" of said trace are further angularly displaced by an angle $\psi$ (FIGS. 3 and 4) which is a function of the observation angles $\alpha$, $\gamma$, so that the whole profile of the head of the rail is reproduced (FIG. 5) in a continuous manner.

This profile of the head of the rail comprises a base A'-B' determined by the lower points of the sides of the head of the rail, the middle point of which is O'. The perpendicular to A'-B' passing through O' intersects the profile at a point C'.

To define the deviations of the actual profile of the head of the rail with respect to a comparison profile having a base A-B and a perpendicular line O-C passing through the middle point of A-B, the comparison profile and the observed profile are superimposed by having the points C and C' coincide and by superimposing the lines O-C and O'-C'.

The comparison profile corresponds to the trace which a reference profile would give if seen at the same projection and observation angles $\alpha$, $\beta$, $\delta$, $\epsilon$.

Another way to make the comparison would be to modify the observed trace obtained (FIG. 5) to take account of the projection and observation angles $\beta$, $\delta$, $\epsilon$ and then to compare it to the reference profile.

It is to be seen in the example shown (FIG. 6) that with respect to the comparison profile R the actual profile has a loss of material in its left half, that is a negative deviation $\Delta-$ and too much material in its right half corresponding to a positive deviation $\Delta+$. For each point of the profile, this deviation $\Delta$ can be given for example in polar or cartesian coordinates, and these data can be used to control the position and the pressure against the rail of reprofiling tools of said rail.

Another way of determining the deviations of the actual profile of the head of the rail with respect to the comparison profile, consists in having coincide the abssissae of the two points A' and A of these profiles and in having coincide the ordinates of the points O' and O of these profiles in order to compare the actual and comparison profiles by the superimposition of their portions corresponding to the inside side of the wall of the rail.

The angle between the two directions of observation can be comprised between 20° and 120° for example, preferably between 30° and 90°. It depends on the shape of the head of the worn off rail, on the size of the optical apparatus and on the desired precision on the measurement.

The optical and/or electronical treatment of the two partial representations of the trace to rectify them, that is to have them pivoted around a fictive center corresponding to the intersection of the directions of observation as well as to make coincide the position of the floating origin of the two partial representations of the trace can be performed by existing means.

This method for the measurement of the transverse profile of a railway track can be applied to the continuous measurement of the profile with a running vehicle. In fact, the source of rays for example and the camera was well as the mirrors, or the cameras, can be mounted on a vehicle which is displaced along the railway track. Therefore, in repeating the measurement at given time intervals it is possible to obtain a sampling of the successive transverse profiles of the rail.

To obtain a measurement of the transverse profile of a rail, which is independent of local defects of the rail, it is possible to make successively several measurements at very close time intervals and to take then the average of these profiles. This is then the mean profile which is compared to the reference profile.

Therefore it is possible in practice to perform the measurement of the transverse profile of the head of a rail in the following order:

1. A profile is measured several times successively every 50 ms.

2. During the following 250 ms. the average of the measured profiles is established.

3. During the following 500 ms. the mean profile obtained is compared with the standard or reference profile and the deviations between these profiles are determined.

4. During the following 4000 ms. the results of these measurements are graphically printed on a printer.

In this way a complete sequence is realized every 5 seconds corresponding to an average profile every 10 m. for a running speed of 7.2 km/h or every 100 m. for a running speed of 72 km/h.

In addition to the graphical representation obtained on the printer, it is of course possible to obtain digital information relative to the deviations between the measured profile and the standard profile taken along a determined number of side lines of the rail. It is also possible to have an instantaneous and continuous visual control by means of a video system.

Thus, thanks to the fact that a particular point, or floating origin, is created on the trace which is projected onto the surface of the rail and that this trace is observed from two directions forming an angle between them and located on either side of a longitudinal plane of the rail, it is possible to obtain, according to this measuring method, a precise measurement of the transverse profile of the rail, including its side faces and its edges even in the presence of burrs or strong deformations of the surface of the head of the rail which would not allow the use of the known methods.

This method is further particularly of interest because the totality of the transverse profile of a rail can be measured. It is very flexible and can be easily adapted, in modifying the directions of observation, to obtain an optical measurement of the profile as a function of the kind of wearing off of the rail. For example for a rail worn practically symmetrically the directions of observation will be practically symmetrical with respect to the longitudinal vertical plane of the rail whereas for a rail worn asymmetrically, presenting for example a burr on one side, the angle of the direction of observation, on the side of the burr, with respect to the longitudinal symmetry plane of the rail will be greater than the angle between this plane and the other direction of observation.

Figure 8:
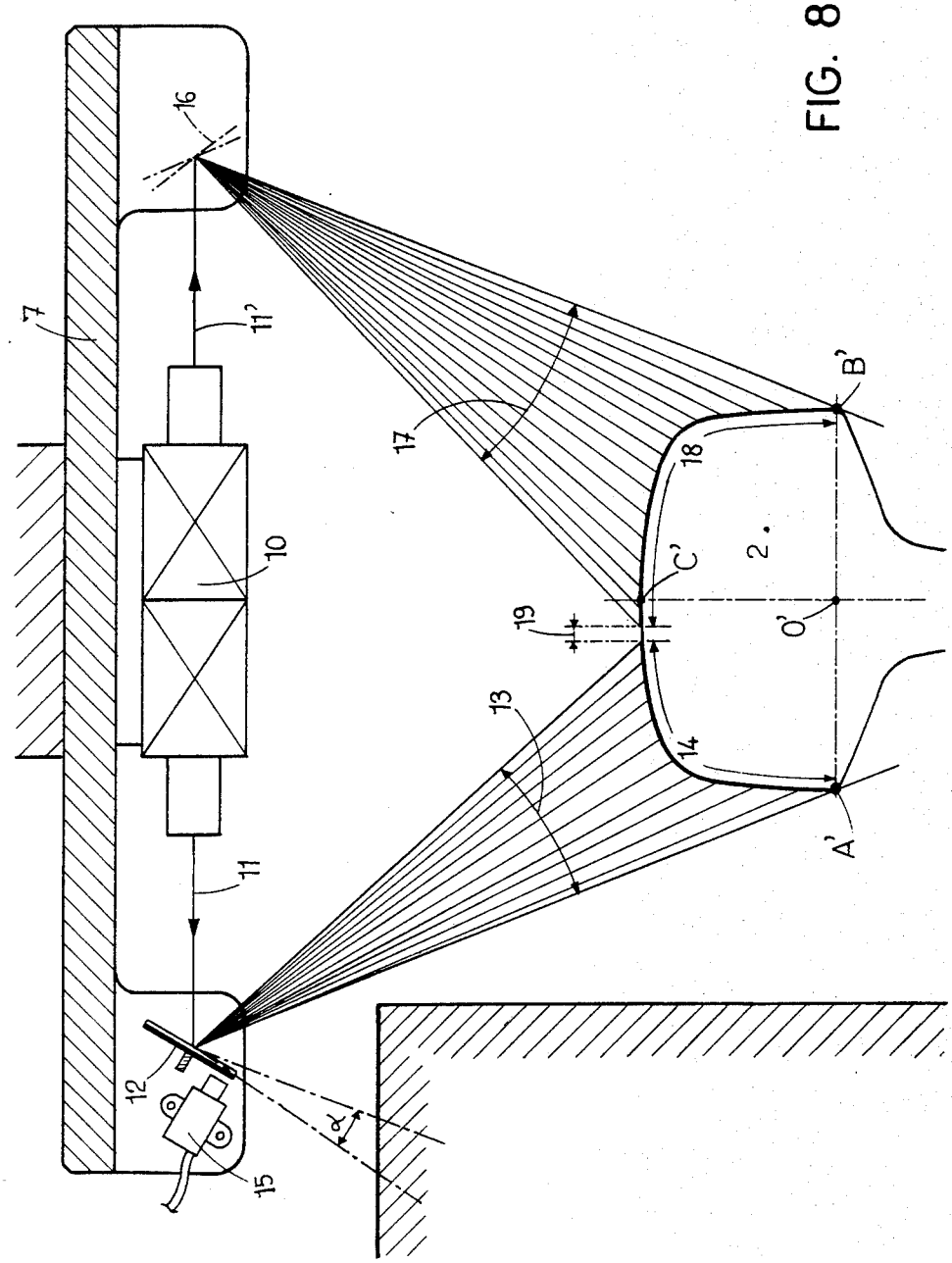
FIG. 8 shows a tranverse cross-section along line A—A of FIG. 7.
Figure 9:
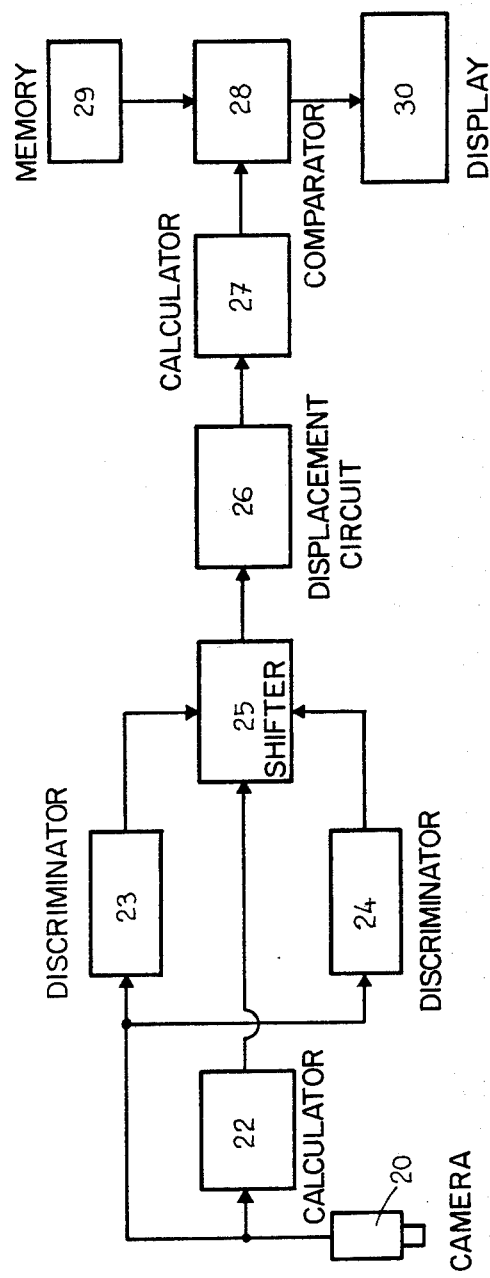
FIG. 9 shows a block scheme of the electronic device used for the treatment of the observed traces and the comparison of the actual profile of the head of the rail with a reference profile.

A device for the use of the method described is schematically shown at FIGS. 7, 8 and 9. This device or apparatus is mounted on a measuring carriage 7 connected to a railway vehicle (not shown) by means of jacks 8, hinged on the carriage and the vehicle, permitting to vertically displacing this carriage 7 with respect to the vehicle and to apply it on the rails 2 through flanged wheels 9 in order to maintain the base 7 of the carriage a constant distance from the rail.

For each rail, the carriage 7 carries a measuring apparatus of the profile of the surface of the head of the rail comprising a source of rays, for example a laser 10 emitting two opposed rays 11, 11' along a direction perpendicular to the longitudinal axis of the rail 2.

The ray 11 impinges on a first oscillating mirror 12 forming a beam of rays 13 contained in a plan forming an angle with the longitudinal axis of the rail 2. The amplitude of the angular oscillation $\alpha$ of the mirror 12 is such that this beam of rays 13 makes a first partial trace 14 on the surface of the outer side wall and a portion of the rolling surface of the head of the rail 2.

The mirror 12 is mounted for oscillation on the carriage 7 by means of resilient blades and is driven in oscillation by an electro-magnetic motor 15 also mounted on the carriage 7.

In an analogus way the ray 11' is reflected by a second oscillating mirror 16 forming a second beam of rays 17, located in the same plane as the beam 13, forming a second partial trace 18 on the surface of the internal side wall and a portion of the rolling surface of the head of the rail 2. The oscillations of the mirrors 12, 16 are preferably rapid and in synchronism.

The first and second partial traces 14, 18 do not overlap, on the contrary a portion 19 of the surface of the head of the rail 12 does not receive the rays, this portion constitutes the particular point, used as floating origin for the two partial traces 14, 18.

In a variant these two partial traces 14, 18 can overlap partially to make a particular point having a higher luminous intensity.

The trace 14, 18, 19 is observed by a camera 20, fixed to the carriage 7, by means of two mirrors 21 (only one of which is visible in FIG. 7) making an angle between them. Each of these mirrors looks at the trace from a different angle and reflects on the camera 20 a part of the trace 14, 18, 19, each of these parts 14, 19 and 18, 19 of the trace containing the particular point 19 of said trace.

The measuring device comprises further an electronic apparatus for the treatment of the signals delivered by the camera 20, representing portions of the trace 14, 18, 19 reflected by each of the mirrors 21, the block scheme of which is illustrated in FIG. 9.

The signals delivered by the camera 20 are fed on the one hand to a calculator 22 defining the position of the discontinuity 19 present in both partial reproductions 14, 18 of the trace, and on the other hand to two discriminators 23, 24. The discriminator 23 delivers only the signals relating to one of the partial representations of the trace whereas the other discriminator 24 delivers only those signals pertaining to the other partial representation of this trace.

The outputs of the calculator 22 and of the two discriminators 23, 24 are connected to the inputs of a shifter 25 permitting through a translation superimposing the two representations of the discontinuity 19 of the trace 14, 18.

The output of this shifter 25 feeds a circuit 26 causing a relative angular displacement between the two partial traces 14, 18 by an angle which is function of the angles from which the trace is observed.

The output signal of the shifter 25 corresponds to the representation shown in FIG. 4 whereas the output signals of the circuit 26 correspond to the representation of FIG. 5 and thus to the actual shape of the profile of the rail 2.

The output signal of circuit 26 feeds a calculator 27 determining the middle line O'-C' perpendicular to the base A'-B' of the profile of the rail. The output signal of this calculator 27 feeds a comparator 28 receiving also from a memory 29 information relating to the shape of a reference profile and to the position of the middle line O-C of said profile. This comparator superimposes the middle lines O-C and O'-C' as well as the points C and C' of these lines and delivers signals corresponding to the superimposed representation of the actual and reference profiles (representation of FIG. 6) and/or signals corresponding to the deviations $\Delta+$, $\Delta-$ between these profiles.

The output of the comparator 28 feeds an oscilloscope and/or a printer 30 enabling a visualization respectively a graphical representation or a numerical representation of the deviations between the reference and actual profiles, for example as described in the U.S. patent application Ser. No. 277,201 filed June 23, 1981 or in the European patent application No. 80 107901.3 published under No. 004488.5.

The embodiment of the different circuits and elements of this electronic apparatus uses conventional technology and will not be described here in detail.

In other embodiments of the apparatus for measuring the profile of the head of a rail the projection of the trace on the surface of this head of the rail can be obtained by a radiation source, for example luminous rays, infra-red rays, ultra-violet rays or rays of other wavelength such as ultrasonic waves. This source of rays can be linear or curved around the rail and comprises a mask comprising two slots defining the two planar beams of rays 13, 17. The definition of the trace is less precise on the other hand the advantage of this solution resides in the constructional simplicity and the low cost of the apparatus.

When the trace is projected in one plane it has seen from above the shape of a straight line, perpendicular or oblique with respect to the longitudinal axis of the rail.

On the contrary when the trace is projected in two half-plans it presents seen from above the shape of a broken line; in this case the angular point of this line can be used as the floating origin of the trace.

In a variant which is not illustrated, but nonetheless important, of the invention, the mirrors 21 can be left out and the observation of the trace is then done by means of two cameras the optical axes of which make an angle between them. This solution is advantageous in that it reduces the number of reflecting surfaces of the apparatus which necessitates maintenance and a relatively frequent cleaning.

In other variants of construction, the mirrors can be replaced by optical fibers possibly provided with objectives. The treatment of the two partial images is the same as in the embodiments previously described.

Taking as reference base the frame of the carriage 7 and when this carriage is equipped with two measuring apparatuses each working with one rail of the railway track, it is possible to position relatively the one with respect to the other the measured profiles and to find out the inclination of the rolling tables of the rails of the railway track.

What I claimed is:

1. A method for the measurement of the transverse profile of the head of a rail of a railway track according to which a trace is projected by radiation onto the surface of the head of a rail of a railway track, and then said trace is observed from several points located outside the plane of projection of said trace, characterized by the fact that one point of the trace is particularized to create a floating origin, by the fact that said trace is observed from at least two directions forming an angle between them and located on either side of a vertical plane passing through the longitudinal axis of the rail to obtain partial reproductions of said trace containing each the floating origin, and by the fact that the images of the floating origin of the partial reproductions of the trace are superimposed and that said partial reproductions are angularly displaced the one with respect to the others around the floating origin, by an angle which depends on the angles from which the trace is observed.

2. A method as claimed in claim 1, characterized by the fact that the measured profile is compared to a comparison profile and that the deviations between these two profiles are determined in graphical or numerical form.

3. A method according to claim 2, characterized by the fact that a base for the measured profile, as well as for the comparison profile is determined, said base passing through the points of these profiles corresponding to the lower points of the side wall of the head of the actual rail, respectively the comparison rail, and that a middle line is determined for each profile which is perpendicular to this base and in the middle of it and finally that the intersection of said middle lines with their respective profile is determined.

4. A method according to claim 3, characterized by the fact that the measured profile is compared to the comparison profile by superimposing the said middle lines of said profile and by superimposing their intersections with their respective profile.

5. A method according to claim 3, characterized by the fact that the measured profile is compared to the comparison profile by putting in coincidence the ordinates of said intersections of said middle lines with their corresponding profile and by putting in coincidence the abissae of the points of the bases of each profile corresponding to the lower point of the inside wall of each profile.

6. A method according to claim 1, characterized by the fact that one measures successively at least two profiles of the rail at different locations along it, then constitutes an average of the measured profiles, and by the fact that this mean value of the measured profiles is compared to a comparison profile to obtain a graphical or numerical representation of the deviations existing between the mean measured profile and the comparison profile.

7. A method according to claim 1, characterized by the fact that the trace is projected in one plane forming an angle with the longitudinal axis of the rail.

8. A method according to claim 1, characterized by the fact that the trace is projected in two half planes forming an angle between them and with the longitudinal axis of the rail.

9. A method as claimed in claim 1, characterized by the fact that the source of rays is a light source.

10. Device for the measurement of the transverse profile of the head of a railway track comprising, mounted on a carriage pulled along the track, a source of rays projecting a trace on the whole surface of the head of the rail and means to observe said trace from several points located outside of the plane of projection, characterized by the fact that it comprises means forming a particular point on the projected trace constituting a floating origin; by the fact that the means to observe the trace enable its observation from at least two directions forming an angle between them and with the plane of projection of the trace, said means to observe being located on either side of a vertical plane containing the longitudinal axis of the rail, and creating two partial reproductions of the trace each containing the image of the floating origin; by the fact that it comprises an electronic apparatus comprising means to superimpose the images of said floating origin of the partial reproductions of the trace and means angularly displacing these partial reproductions by an angle depending on the angles from which the trace is observed and reconstituting the totality of the transverse profile of the head of the rail.

11. Device according to claim 10, characterized by the fact that the source of rays projects the trace in a plane forming an angle with the longitudinal axis of the rail.

12. Device according to claim 11, characterized by the fact that it comprises two mirrors inclined the one with respect to the other, reflecting each one a partial reproduction of the rail into a same camera.

13. Device according to claim 11, characterized by the fact that it comprises two cameras for observing the rail, the optical axes of said cameras forming an angle between them.

14. Device according to claim 11, characterized by the fact that it comprises two optical fibers taking the partial representations of the rail and transmitting them to one or two cameras.

15. Device according to claim 11, characterized by the fact that the source of rays is a laser fixed to the carriage, emitting two opposed rays contained in a single plane, and by the fact that it comprises two oscillating mirrors mounted on said carriage and each receiving one of the laser rays and directing it onto a portion of the surface of the head of the rail.

16. Device according to claim 15, characterized by the fact that the amplitude of oscillation of the mirrors is such that a portion of the surface of the head of the rail, located in the plane of the trace, does not receive any rays and constitutes a particular point forming a floating origin the luminous intensity of which is less than that of the rest of the trace.

17. Device according to claim 15, characterized by the fact that the amplitude of oscillation of the mirrors is such that a portion of the surface of the head of the rail, located in the plane of the trace, receives rays coming from both mirrors constituting a particular point forming a floating origin the luminous intensity of which is greater than that of the rest of the trace.

* * * * *